United States Patent
Araki (10) Patent No.: US 10,178,153 B2
(45) Date of Patent: Jan. 8, 2019

(54) IMAGE TRANSMISSION APPARATUS AND STORAGE MEDIUM

(71) Applicant: KYOCERA Document Solutions Inc., Osaka (JP)

(72) Inventor: Takashi Araki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 261 days.

(21) Appl. No.: 15/182,830

(22) Filed: Jun. 15, 2016

(65) Prior Publication Data
US 2016/0381119 A1 Dec. 29, 2016

(30) Foreign Application Priority Data
Jun. 25, 2015 (JP) .................................. 2015-127543

(51) Int. Cl.
H04L 29/08 (2006.01)
H04L 29/06 (2006.01)
H04N 1/00 (2006.01)

(52) U.S. Cl.
CPC .............. *H04L 67/06* (2013.01); *H04L 69/18* (2013.01); *H04N 1/00095* (2013.01); *H04N 2201/0094* (2013.01)

(58) Field of Classification Search
CPC ..... H04L 67/06; H04L 69/18; H04N 1/00095; H04N 2201/0094
(Continued)

(56) References Cited

U.S. PATENT DOCUMENTS

2002/0054335 A1* 5/2002 Sekiguchi ............... H04L 51/30
358/1.15
2007/0159652 A1* 7/2007 Sato ................... H04N 1/00222
358/1.15
2008/0313290 A1* 12/2008 Park ................... H04N 1/00214
709/206

FOREIGN PATENT DOCUMENTS

JP 2004-194080 A 7/2004
JP 2007-133886 A 5/2007
(Continued)

OTHER PUBLICATIONS

An Office Action; "Notification of Reasons for Refusal," mailed by the Japanese Patent Office dated Feb. 7, 2018, which corresponds to Japanese Patent Application No. 2015-127543 and is related to U.S. Appl. No. 15/182,830; with English Translation.

*Primary Examiner* — Joseph L Greene
(74) *Attorney, Agent, or Firm* — Studebaker & Brackett PC (57) ABSTRACT

In an image transmission apparatus, a reading device reads image data from a document. A setting acquisition section acquires a transmission setting as a setting for transmission of the image data. An image transmission section transmits the image data through a communication device according to the transmission setting. The transmission setting includes a first transmission standard for transmitting a first file containing the image data, a second transmission standard for transmitting a second file containing the image data that is different from the first transmission standard, and a maximum size of the first file transmittable according to the first transmission standard. The image transmission section transmits the first file according to the first transmission standard when a size of the first file does not exceed the maximum size, and the second file according to the second (Continued)

transmission standard when the size of the first file exceeds the maximum size.

4 Claims, 7 Drawing Sheets

(58) Field of Classification Search
USPC .......................................................... 709/217
See application file for complete search history.

(56) References Cited

FOREIGN PATENT DOCUMENTS

| | | |
|---|---|---|
| JP | 2011-061563 A | 3/2011 |
| JP | 2013-047957 A | 3/2013 |

\* cited by examiner

FIG. 1

| Item | | Setting value |
|---|---|---|
| Transmission mode | | Mode 1: file is divided before transmission according to SMTP when file size exceeds SMTP maximum transmission size |
| | | Mode 2: file is transmitted to SMB folder when file size exceeds SMTP maximum transmission size |
| | | Mode 3: file is transmitted to FTP folder when file size exceeds SMTP maximum transmission size |
| | | Mode 4: file is transmitted to cloud service when file size exceeds SMTP maximum transmission size |
| | | . . . |
| Maximum transmission size | SMTP | 40KB |
| | SMB folder | 100KB |
| | FTP folder | 150KB |
| | Cloud service | 300KB |
| | . . . | . . . |
| Destination | SMTP | xxx@xxx.xx |
| | SMB folder | ¥¥xxx¥xx |
| | FTP folder | xxx.xxx.xxx.xxx |
| | Cloud service | xxx.xxx.xxx.xxx |
| | . . . | . . . |

FIG. 7

IMAGE TRANSMISSION APPARATUS AND STORAGE MEDIUM

INCORPORATION BY REFERENCE

The present application claims priority under 35 U.S.C. § 119 to Japanese Patent Application No. 2015-127543, filed Jun. 25, 2015. The contents of this application are incorporated herein by reference in their entirety.

BACKGROUND

The present disclosure relates to image transmission apparatuses and storage media.

Some image transmission apparatuses read image data from an original document using a reading device, and transmit the image data using a communication device. Among such image transmission apparatuses are those that divide image data read from an original document by a reading device into portions so that the size of a file containing each portion of the image data does not exceeds a predetermined size, and transmit the files. In some of these image transmission apparatuses, each piece of sheet data included in image data, that corresponds to each sheet, is divided into a plurality of portions to generate a plurality of files.

SUMMARY

An image transmission apparatus according to the present disclosure includes a reading device, a communication device, a setting acquisition section, and an image transmission section. The reading device reads image data from an original document. The communication device performs communication. The setting acquisition section acquires a transmission setting as a setting for transmission of the image data performed by the communication device. The image transmission section transmits the image data read from the original document by the reading device, through the communication device, according to the transmission setting acquired by the setting acquisition section. The transmission setting includes a first transmission standard for transmitting a first file containing the image data, a second transmission standard for transmitting a second file containing the image data, the second transmission standard being different from the first transmission standard, and a maximum size indicating a maximum value of a size of the first file allowed to be transmitted according to the first transmission standard. The image transmission section transmits the first file according to the first transmission standard when the size of the first file is not more than the maximum size. The image transmission section transmits the second file according to the second transmission standard when the size of the first file exceeds the maximum size.

A non-transitory computer-readable storage medium according to the present disclosure has an application program stored therein, the application program causing an image transmission apparatus to function as a setting acquisition section and an image transmission section. The image transmission apparatus includes a reading device configured to read image data from an original document and a communication device configured to perform communication. The setting acquisition section acquires a transmission setting as a setting for transmission of the image data performed by the communication device. The image transmission section transmits the image data read from the original document by the reading device, through the communication device, according to the transmission setting acquired by the setting acquisition section. The transmission setting includes a first transmission standard for transmitting a first file containing the image data, a second transmission standard for transmitting a second file containing the image data, the second transmission standard being different from the first transmission standard, and a maximum size indicating a maximum value of a size of the first file allowed to be transmitted according to the first transmission standard. The image transmission section transmits the first file according to the first transmission standard when the size of the first file is not more than the maximum size. The image transmission section transmits the second file according to the second transmission standard when the size of the first file exceeds the maximum size.

DETAILED DESCRIPTION

Embodiments of the present disclosure will now be described with reference to the accompanying drawings.

Firstly, a configuration of a multifunction peripheral (MFP) that is an image transmission apparatus according to this embodiment will be described.

Figure 1:
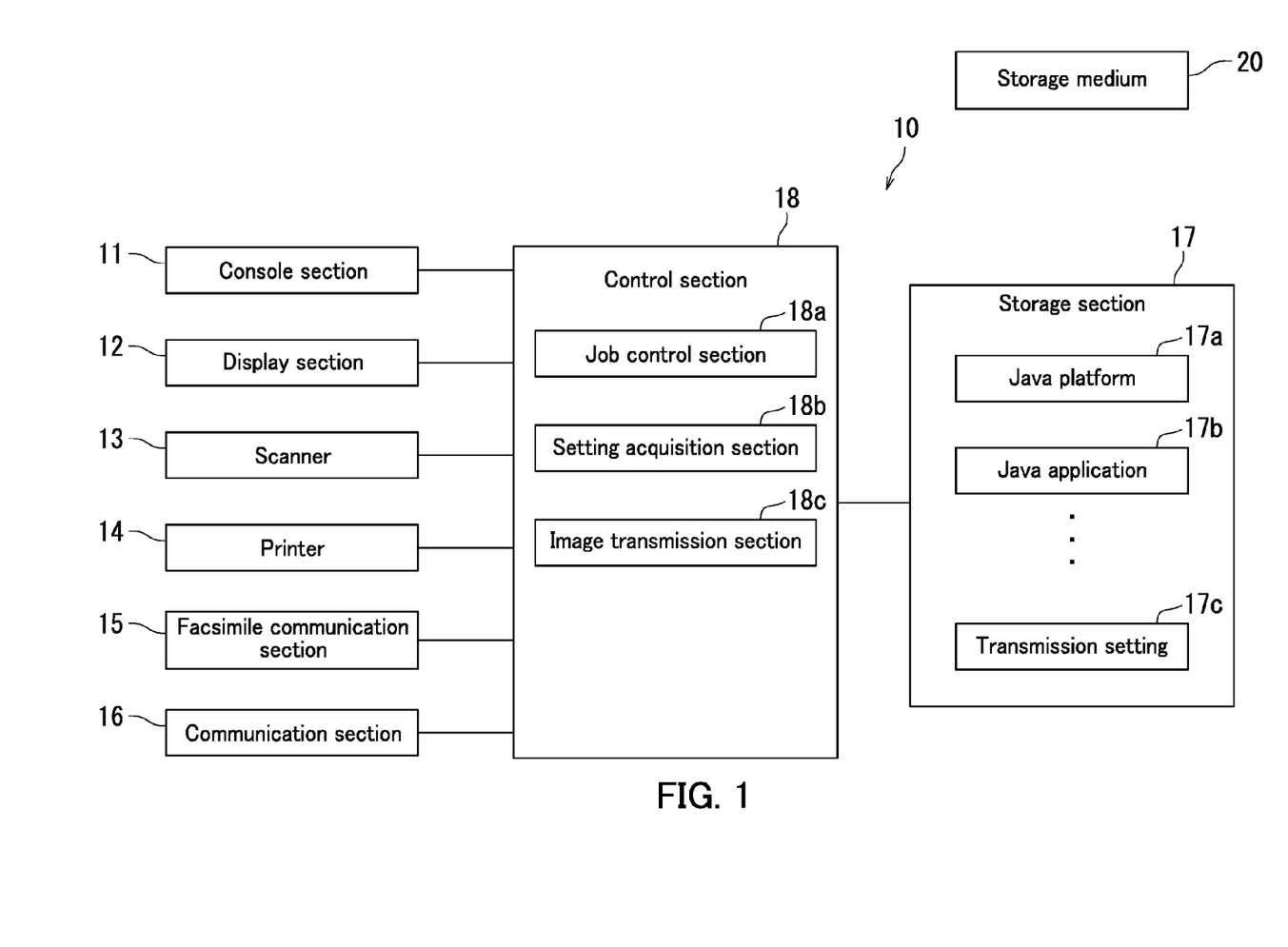
FIG. 1 is a block diagram of an MFP according to an embodiment of the present disclosure.

FIG. 1 is a block diagram of the MFP 10 of this embodiment.

As shown in FIG. 1, the MFP 10 includes a console section 11, a display section 12, a scanner 13, a printer 14, a facsimile communication section 15, a communication section 16, a storage section 17, and a control section 18. The console section 11 is an operation device for entering various operational inputs, such as buttons or the like. The display section 12 is a display device for displaying various items of information, such as a liquid crystal display (LCD) or the like. The scanner 13 is a reading device for reading image data from an original document. An original document contains one or more sheets (one or more pages). Image data contains one or more pieces of sheet data. Sheet data is data indicating an image on each of a plurality of sheets contained in an original document. The printer 14 is a printing device for performing printing on a recording medium, such as paper or the like. The facsimile communication section 15 is a facsimile device for performing facsimile communication with an external facsimile device (not shown) through a communication line, such as a public telephone line or the like. The communication section 16 is a communication device for communicating with an external device through a network, such as a local area network (LAN), the Internet, or the like. The storage section 17 is a storage device for storing various items of data, such as a semiconductor memory, a hard disk drive (HDD), or the like. The control section 18 controls the entire MFP 10.

The storage section 17 can store a Java (registered trademark) platform 17a. The storage section 17 can store a plurality of Java applications 17b that are an application program that operates on the Java platform 17a. The Java platform 17a and the Java applications 17b may be installed in the MFP 10 during manufacture of the MFP 10. The Java platform 17a and the Java applications 17b may be additionally installed in the MFP 10 from a storage medium 20, such as an SD card, a universal serial bus (USB) memory, or the like. The Java platform 17a and the Java applications 17b may be additionally installed in the MFP 10 from a network.

The Java platform 17a is a program for managing the life cycle of a Java application 17b, such as installing, activation, inactivation, uninstalling, and the like of the Java application 17b.

The Java applications 17b are a program for utilizing the functions of the MFP 10, and extending the functions of the MFP 10 by cooperating with an MFP other than the MFP 10. The functions of the MFP 10 include, for example, scanning, copying, and sending. Scanning is the function of reading image data from an original document using the scanner 13. Copying is the function of performing printing on a recording medium using the printer 14 on the basis of image data read from an original document by the scanner 13. Sending is the function of transmitting data, such as image data or the like, through the facsimile communication section 15 or the communication section 16.

The storage section 17 can store a transmission setting 17c. The transmission setting 17c is for transmission of image data read from an original document by the scanner 13, which is performed by the communication section 16.

Figure 2:
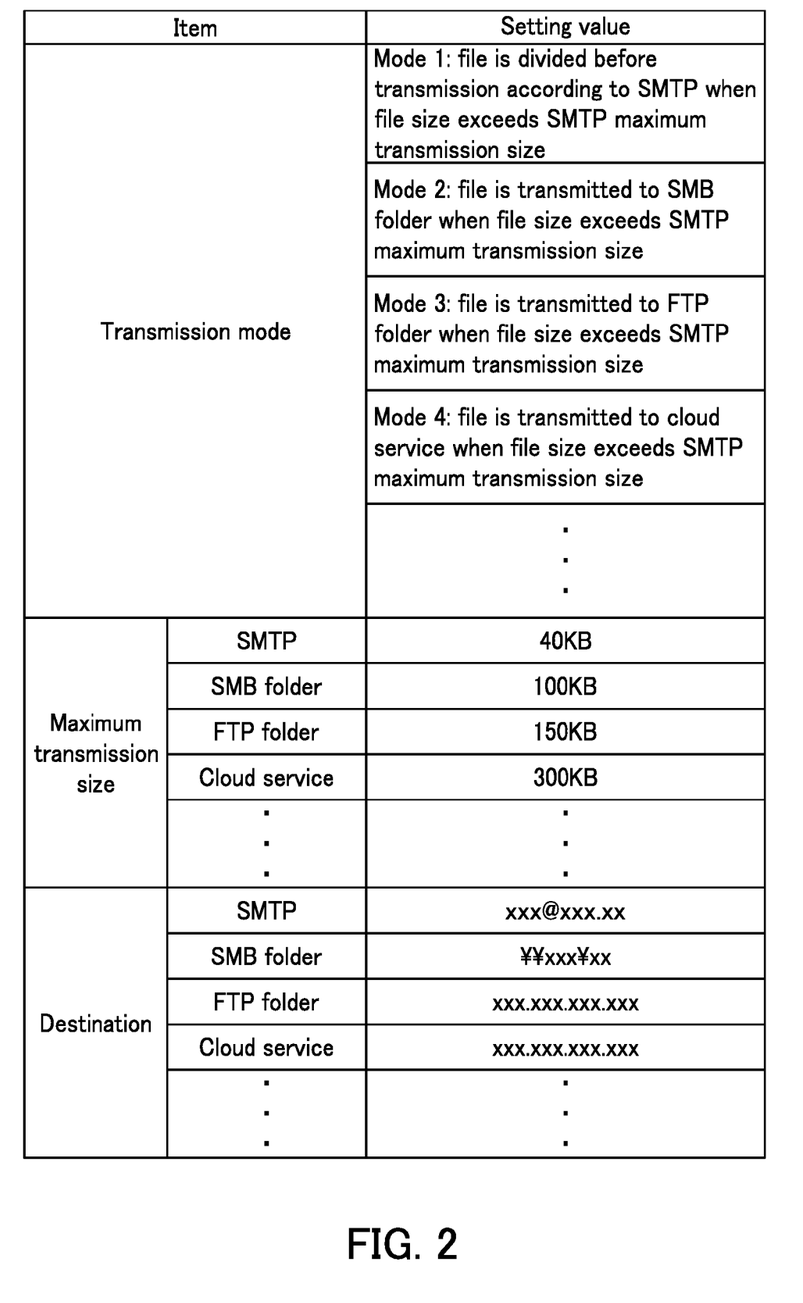
FIG. 2 is a diagram showing a list example of setting values set in a transmission setting shown in FIG. 1.

FIG. 2 is a diagram showing a list example of setting values set in the transmission setting 17c.

As shown in FIG. 2, the transmission setting 17c includes, for example, a "transmission mode," a "maximum transmission size," and a "destination." The "transmission mode" indicates a mode in which image data is transmitted. The "maximum transmission size" is set for each image data transmission standard. The maximum transmission size indicates the maximum size of a file that can be transmitted. A file contains image data. The "destination" is set for each image data transmission standard.

The "transmission mode" can be set to, for example, one of setting values "mode 1," "mode 2," "mode 3," and "mode 4." The "transmission mode" may be set to other setting values in addition to "mode 1," "mode 2," "mode 3," and "mode 4." For example, the administrator of the MFP 10 may set the "transmission mode" to a setting value according to an instruction given to the Java application 17b through the console section 11 or the communication section 16. The transmission mode can also be set to a setting value according to a difference in confidentiality, availability, and integrity.

In "mode 1," when the size of a file containing image data exceeds the maximum transmission size of SMTP, the file is divided into files, where each piece of sheet data included in image data is the smallest constituent unit of the files obtained by the division, and when the size of each resultant file is not more than the SMTP maximum transmission size, the file is transmitted according to SMTP as a first transmission method. The SMTP maximum transmission size is the maximum size of a file that can be transmitted according to Simple Mail Transfer Protocol (SMTP). A first transmission standard is for transmission of a file according to SMTP. A file that is transmitted according to the first transmission standard corresponds to a "first file." The division will be described in detail below with reference to FIGS. 3-7.

In "mode 2," when the size of a file is not more than the SMTP maximum transmission size as a first maximum size, the file is transmitted according to SMTP as a first transmission standard, and when the size of a file exceeds the SMTP maximum transmission size, the file is transmitted to an SMB folder according to Server Message Block (SMB) as a second transmission method. The first maximum size indicates the maximum value of the size of a file that can be transmitted according to the first transmission standard. When the transmission mode is set to the setting value "mode 2," the standard according to which a file is transmitted to an SMB folder according to SMB corresponds to a "second transmission standard" that is different from the first transmission standard. A file that is transmitted according to the second transmission standard corresponds to a "second file." A second file indicates one or more files.

In "mode 3," when the size of a file is not more than the SMTP maximum transmission size as a first maximum size, the file is transmitted according to SMTP as a first transmission standard, and when the size of a file exceeds the SMTP maximum transmission size, the file is transmitted to an FTP folder according to File Transfer Protocol (FTP) as a second transmission method. When the transmission mode is set to the setting value "mode 3," the standard according to which a file is transmitted to an FTP folder according to FTP corresponds to a "second transmission standard" that is different from the first transmission standard.

In "mode 4," when the size of a file is not more than the SMTP maximum transmission size as a first maximum size, the file is transmitted according to SMTP as a first transmission standard, and when the size of a file exceeds the SMTP maximum transmission size, the file is transmitted to a specific cloud service, which is a second transmission method. When the transmission mode is set to the setting value "mode 3," the standard according to which a file is transmitted to a specific cloud service corresponds to a "second transmission standard" that is different from the first transmission standard.

The "maximum transmission size" can include items such as "SMTP," "SMB folder," "FTP folder," and "cloud service." The "maximum transmission size" can also include other items in addition to "SMTP," "SMB folder," "FTP folder," and "cloud service." Note that the "maximum transmission size" may include items corresponding to setting values for the "transmission modes," i.e., items for the first transmission standard, and optionally, items for the second transmission standard. For example, the administrator of the MFP 10 can further set items having a lower level than that of "SMTP," "SMB folder," "FTP folder", and "cloud service," and corresponding setting values, in the "maximum transmission size" according to an instruction given to the Java application 17b through the console section 11 or the communication section 16. The "maximum transmission sizes" for transmission standards normally supported by the MFP 10, such as SMTP, SMB, FTP, and the like, may be set in the MFP 10 separately from the transmission setting 17c. Note that, as to the setting values in the "maximum transmission size," a setting value indicating a second maximum size needs to be more than a setting value indicating the first maximum size. The second maximum size indicates the maximum value of the size of a file that can be transmitted according to the second transmission standard. For example, a setting value for the item "SMTP" may be set according to a reception size limit on an SMTP server.

The "destination" can include items such as "SMTP," "SMB folder," "FTP folder," and "cloud service." The "destination" can also include other items in addition to "SMTP," "SMB folder," "FTP folder," and "cloud service." Note that the "destination" may include items corresponding to setting values for the "transmission modes," i.e., items for the first transmission standard, and optionally, items for the second transmission standard. For example, the administrator of the MFP 10 can further set items having a lower level than that of "SMTP," "SMB folder," "FTP folder," and "cloud service," and corresponding setting values, in the "destination" according to an instruction given to the Java application 17b through the console section 11 or the communication section 16. The "destination" for transmission standards normally supported by the MFP 10, such as SMTP, SMB, FTP, and the like, may be set in the MFP 10 separately from the transmission setting 17c.

The control section 18 of FIG. 1 includes, for example, a central processing section (CPU), a read only memory (ROM), and a random access memory (RAM). The ROM previously stores a program and various items of data. The CPU executes a program stored in the ROM or the storage section 17. The RAM is used as a work area for the CPU.

The control section 18 executes a program stored in the ROM or the storage section 17 to function as a job control section 18a. The job control section 18a controls execution of a job performed by the MFP 10.

The control section 18 executes the Java application 17b stored in the storage section 17 to function as a setting acquisition section 18b and an image transmission section 18c. The setting acquisition section 18b and the image transmission section 18c that the control section 18 executes the Java application 17b to function as are simply referred to as "the setting acquisition section 18b of the Java application 17b" and "the image transmission section 18c of the Java application 17b," respectively. The setting acquisition section 18b acquires the transmission setting 17c. The image transmission section 18c transmits image data read from an original document by the scanner 13, through the communication section 16, according to the transmission setting 17c acquired by the setting acquisition section 18b.

Note that the MFP 10 normally supports, for example, SMTP, SMB, and FTP as transmission standards, and may not normally support transmission to a cloud service. In such a case, the MFP 10 can use the job control section 18a to carry out transmission of a file according to any of SMTP, SMB, and FTP. However, it is necessary for the MFP 10 to execute the Java application 17b in order to carry out transmission of a file to a cloud service.

Next, an operation of the MFP 10 will be described.

Figure 3:
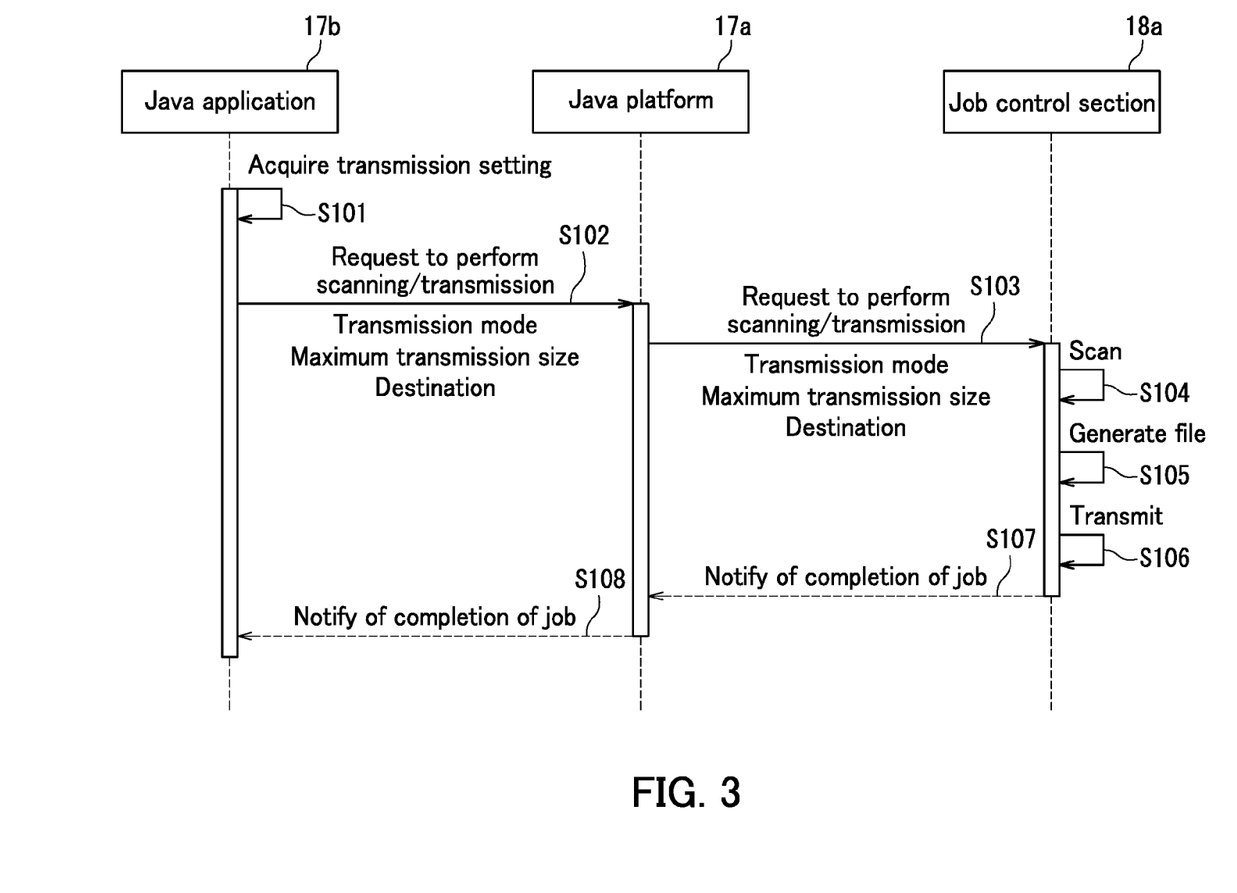
FIG. 3 is a sequence diagram showing an operation example of the MFP of FIG. 1.

FIG. 3 is a sequence diagram showing an operation example of the MFP 10 in a case where image data read from an original document by the scanner 13 is transmitted by the communication section 16.

When the user gives an instruction to the Java application 17b through the console section 11, the control section 18 starts the operation of FIG. 3.

As shown in FIG. 3, the setting acquisition section 18b of the Java application 17b acquires the transmission setting 17c from the storage section 17 (S101).

Next, the image transmission section 18c of the Java application 17b requests the Java platform 17a to perform scanning/transmission (S102). The scanning/transmission indicates the process of reading image data from an original document using the scanner 13, and transmitting the image data using the communication section 16. Here, the image transmission section 18c incorporates, into the request of S102, the setting values of the items "transmission mode," "maximum transmission size," and "destination" in the transmission setting 17c acquired in S101.

When the Java platform 17a is requested by the image transmission section 18c to perform scanning/transmission in S102, the Java platform 17a requests the job control section 18a to perform scanning/transmission (S103). Here, the Java platform 17a incorporates the setting values received from the image transmission section 18c in S102, into the request in S103.

As shown in S104 and S105, the job control section 18a generates a file containing image data, according to the transmission setting. When the job control section 18a is requested by the Java platform 17a to perform scanning/transmission in S103, the job control section 18a reads image data from an original document using the scanner 13 (S104).

Note that, after the end of the process of S103, each time a change occurs in the status of the scanning/transmission job, the job control section 18a notifies the image transmission section 18c of the Java application 17b of the job status through the Java platform 17a. A change in the job status indicates that, for example, scanning, file generation, or file transmission is underway. Therefore, for example, the image transmission section 18c can display the status of the scanning/transmission job on the display section 12.

After the end of the process of S104, the job control section 18a generates a file according to the setting values received from the Java platform 17a in S103 (S105).

For example, when the setting value of the "transmission mode" in the transmission setting 17c is "mode 1," and the setting value of the item "SMTP" of the item "maximum transmission size" in the transmission setting 17c is "40 KB" (see FIG. 2), the job control section 18a generates files from the image data read in S104 in order with sheet data corresponding to the first sheet first. The job control section 18a combines a plurality of pieces of sheet data to generate a file that has a size of not more than 40 KB as the first maximum size.

Figure 4A:
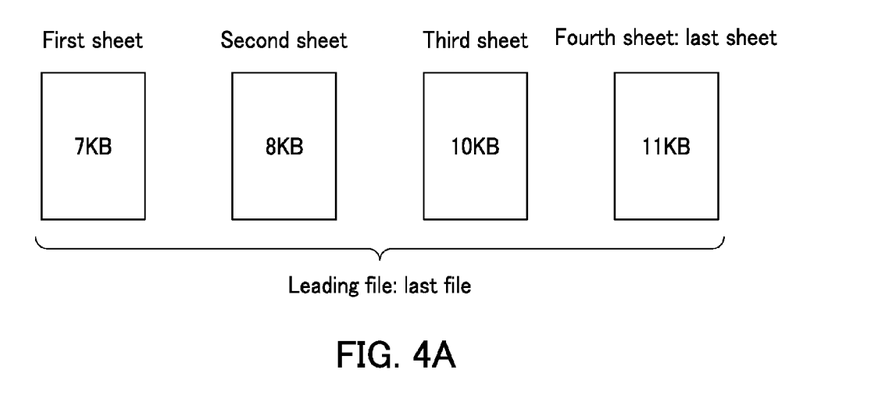
FIGS. 4A-4C are diagrams showing file examples generated by the MFP of FIG. 1.
Figure 4B:
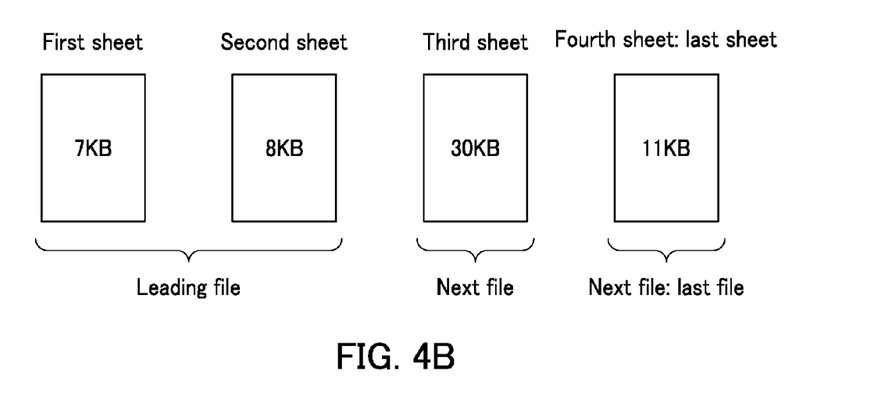
Figure 4C:
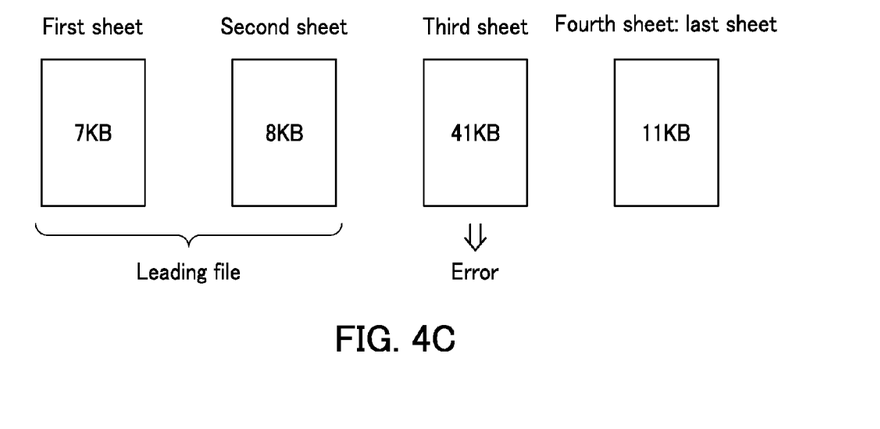

A more specific description will be given with reference to FIGS. 4A-4C. FIGS. 4A-4C are diagrams showing file examples generated by the MFP 10 of FIG. 1. As shown in FIG. 4A, when the image data read in S104 includes a total of four pieces of sheet data, and the sizes of sheet data of the first sheet, the second sheet, the third sheet, and the fourth sheet are 7 KB, 8 KB, 10 KB, and 11 KB, respectively, the total size of all pieces of sheet data included in the image data is not more than 40 KB as the first maximum size. In such a case, the job control section 18a generates a single file containing all pieces of sheet data included in the image data read in S104.

As shown in FIG. 4B, when the image data read in S104 includes a total of four pieces of sheet data, and the sizes of sheet data of the first sheet, the second sheet, the third sheet, and the fourth sheet are 7 KB, 8 KB, 30 KB, and 11 KB, respectively, the total size of all pieces of sheet data included in the image data exceeds 40 KB as the first maximum size. In such a case, the job control section 18a generates files each of which has a size of not more than 40 KB.

Figure 5:
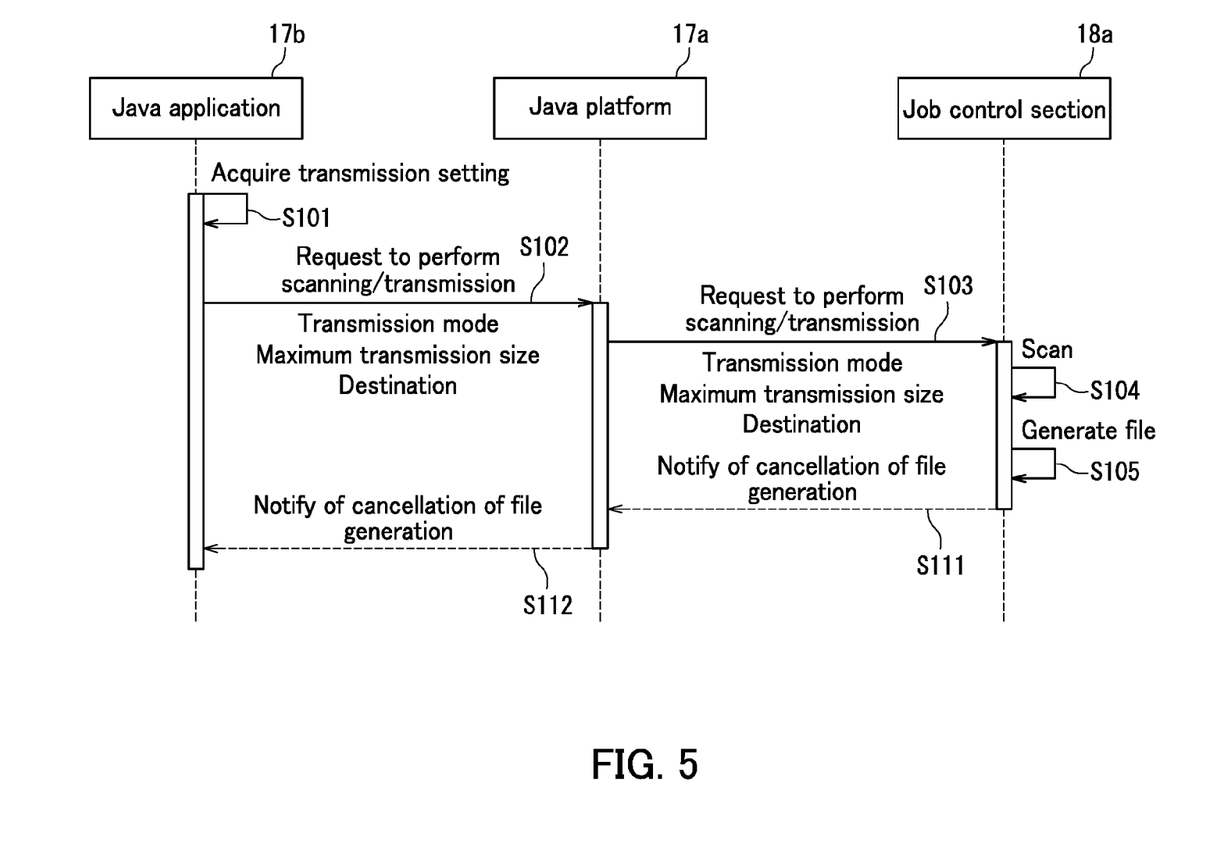
FIG. 5 is a sequence diagram showing an operation example of the MFP of FIG. 1 that is different from that shown in FIG. 3.

FIG. 4C will be described while additionally referring to FIG. 5. FIG. 5 is a sequence diagram showing an operation example of the MFP 10 that is different from that shown in FIG. 3. Note that S101-S105 of FIG. 5 correspond to S101-S105 of FIG. 3, and provide similar processes. As shown in FIG. 4C, the image data read in S104 includes a total of four pieces of sheet data, and the sizes of sheet data of the first sheet, the second sheet, the third sheet, and the fourth sheet are 7 KB, 8 KB, 41 KB, and 11 KB, respectively, the size of sheet data corresponding to the third sheet included in the image data exceeds 40 KB as the first maximum size. In such a case, the job control section 18a cancels generation of a file in S105. As shown in FIG. 5, the job control section 18a notifies the image transmission section 18c of the Java application 17b of the cancellation of file generation through the Java platform 17a (S111, S112). Therefore, the image transmission section 18c can display an error in scanning/transmission on the display section 12, for example.

For example, when the setting value of the item "transmission mode" in the transmission setting 17c is "mode 2," and the setting values of the items "SMTP" and "SMB folder" of the term "maximum transmission size" in the transmission setting 17c are "40 KB" and "100 KB," respectively, the job control section 18a generates files from the image data read in S104 in order with sheet data corresponding to the first sheet first. The job control section 18a combines a plurality of pieces of sheet data to generate a file that has a size of not more than 40 KB as the first maximum size. When there is a piece of sheet data having a size exceeding 40 KB of the pieces of sheet data included in the image data read in S104, the job control section 18a combines a plurality of pieces of sheet data to generate a file that has a size of not more than 100 KB as the second maximum size.

Specifically, as shown in FIG. 4A, when the image data read in S104 includes a total of four pieces of sheet data, and the sizes of sheet data of the first sheet, the second sheet, the third sheet, and the fourth sheet are 7 KB, 8 KB, 10 KB, and 11 KB, respectively, the total size of all pieces of sheet data included in the image data is not more than 40 KB as the first maximum size. In such a case, the job control section 18a generates a single file containing all pieces of sheet data included in the image data read in S104.

As shown in FIG. 4B, when the image data read in S104 includes a total of four pieces of sheet data, and the sizes of sheet data of the first sheet, the second sheet, the third sheet, and the fourth sheet are 7 KB, 8 KB, 30 KB, and 11 KB, respectively, the total size of all pieces of sheet data included in the image data exceeds 40 KB as the first maximum size. In such a case, the job control section 18a generates files each of which has a size of not more than 40 KB.

Figure 6A:
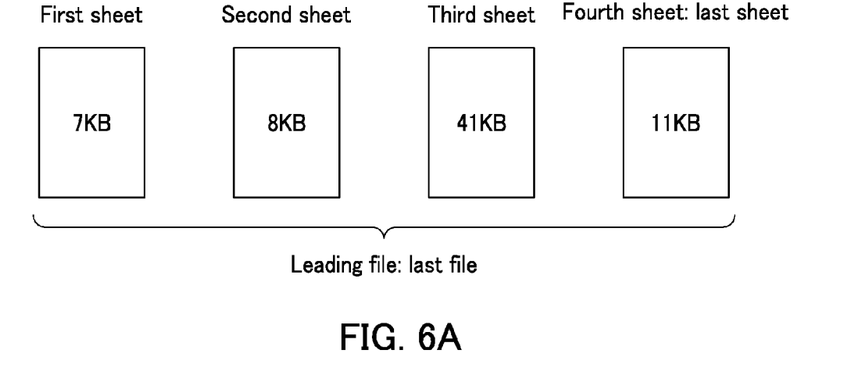
FIGS. 6A-6C are diagrams showing file examples generated by the MFP of FIG. 1 that are different from the examples of FIGS. 4A-4C.
Figure 6B:
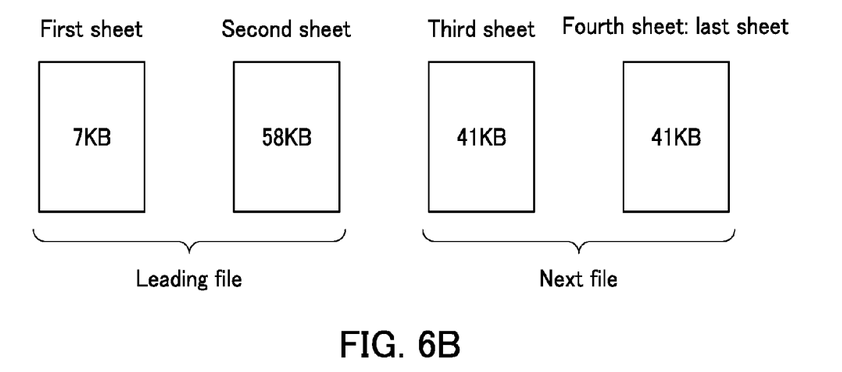
Figure 6C:
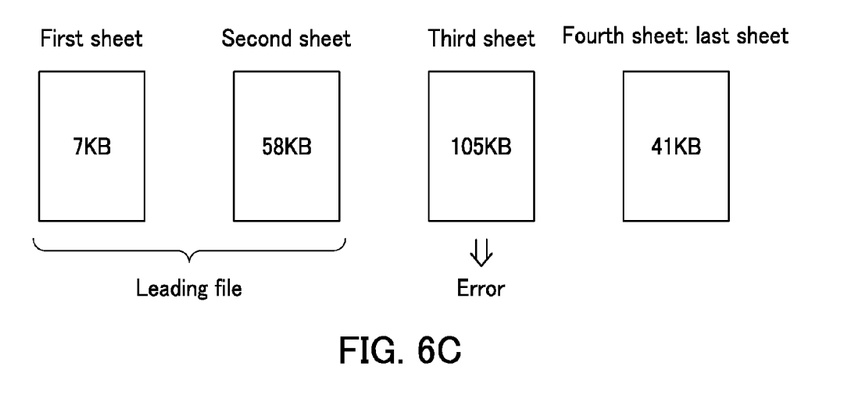

FIGS. 6A-6C are diagrams showing file examples generated by the MFP 10 of FIG. 1 that are different from the examples of FIGS. 4A-4C. As shown in FIG. 6A, when the image data read in S104 includes a total of four pieces of sheet data, and the sizes of sheet data of the first sheet, the second sheet, the third sheet, and the fourth sheet are 7 KB, 8 KB, 41 KB, and 11 KB, respectively, the size of sheet data corresponding to the third sheet included in the image data exceeds 40 KB as the first maximum size. Meanwhile, the total size of all pieces of sheet data included in the image data read in S104 is not more than 100 KB as the second maximum size. In such a case, the job control section 18a generates a single file containing all pieces of sheet data included in the image data read in S104.

As shown in FIG. 6B, when the image data read in S104 includes a total of four pieces of sheet data, and the sizes of sheet data of the first sheet, the second sheet, the third sheet, and the fourth sheet are 7 KB, 58 KB, 41 KB, and 41 KB, respectively, the sizes of sheet data corresponding to the second, third, and fourth sheets included in the image data each exceed 40 KB as the first maximum size. Meanwhile, the total size of all pieces of sheet data included in the image data read in S104 exceeds 100 KB as the second maximum size. In such a case, the job control section 18a generates files each of which has a size of not more than 100 KB.

As shown in FIG. 6C, when the image data read in S104 includes a total of four pieces of sheet data, and the sizes of sheet data of the first sheet, the second sheet, the third sheet, and the fourth sheet are 7 KB, 58 KB, 105 KB, and 41 KB, respectively, the size of sheet data corresponding to the third sheet included in the image data exceeds 100 KB as the second maximum size. In such a case, the job control section 18a cancels generation of a file in S105. As shown in FIG. 5, the job control section 18a notifies the image transmission section 18c of the Java application 17b of the cancellation of file generation through the Java platform 17a (S111, S112). Therefore, the image transmission section 18c can display an error in scanning/transmission on the display section 12, for example.

For example, when the setting value of the item "transmission mode" in the transmission setting 17c is "mode 3," and the setting values of the items "SMTP" and "FTP folder" of the item "maximum transmission size" in the transmission setting 17c are "40 KB" and "150 KB," respectively, the job control section 18a generates files from the image data read in S104 in order with sheet data corresponding to the first sheet first. The job control section 18a combines a plurality of pieces of sheet data to generate a file that has a size of not more than 40 KB as the first maximum size. When there is a piece of sheet data having a size exceeding 40 KB of the pieces of sheet data included in the image data read in S104, the job control section 18a combines a plurality of pieces of sheet data to generate a file that has a size of not more than 150 KB as the second maximum size.

For example, when the setting value of the item "transmission mode" in the transmission setting 17c is "mode 4," and the setting values of the items "SMTP" and "cloud service" of the item "maximum transmission size" in the transmission setting 17c are "40 KB" and "300 KB," respectively, the job control section 18a generates files from the image data read in S104 in order with sheet data corresponding to the first sheet first. The job control section 18a combines a plurality of pieces of sheet data to generate a file that has a size of not more than 40 KB as the first maximum size. When there is a piece of sheet data having a size exceeding 40 KB of the pieces of sheet data included in the image data read in S104, the job control section 18a combines a plurality of pieces of sheet data to generate a file that has a size of not more than 300 KB as the second maximum size.

As shown in FIG. 3, after the process of S105, when a transmission standard according to which the files generated in S105 can be transmitted is normally supported by the MFP 10, the job control section 18a transmits the files generated in S105 through the communication section 16 according to the setting values received from the Java platform 17a in S103 (S106).

For example, when the setting value of the item "transmission mode" in the transmission setting 17c is "mode 1," and the setting values of the item "SMTP" of the item "maximum transmission size" in the transmission setting 17c is "40 KB," then if all the files generated in S105 have a size of not more than 40 KB as the first maximum size, the job control section 18a transmits the files to a destination indicated by the setting value of the item "SMTP" of the item "destination" of the setting values received from the Java platform 17a in S103, through the communication section 16. In other words, the communication section 16 transmits the files according to SMTP as the first transmission standard.

For example, when the setting value of the item "transmission mode" in the transmission setting 17c is "mode 2," and the setting values of the items "SMTP" and "SMB folder" of the term "maximum transmission size" in the transmission setting 17c are "40 KB" and "100 KB," respectively, then if all the files generated in S105 have a size of not more than 40 KB as the first maximum size, the job control section 18a transmits the files to a destination indicated by the setting value of the item "SMTP" of the item "destination" of the setting values received from the Java platform 17a in S103, through the communication section 16. In other words, the communication section 16 transmits the files according to SMTP as the first transmission standard. Meanwhile, when any of the files generated in S105 has a size exceeding 40 KB as the first maximum size, and all the files generated in S105 have a size of not more than 100 KB as the second maximum size, the job control section 18a transmits the files to a destination indicated by the setting value of the item "SMB folder" of the item "destination" of the setting values received from the Java platform 17a in S103, through the communication section 16. In other words, the communication section 16 transmits the files according to SMB as the second transmission standard.

For example, when the setting value of the item "transmission mode" in the transmission setting 17c is "mode 3," and the setting values of the items "SMTP" and "FTP folder" of the term "maximum transmission size" in the transmission setting 17c are "40 KB" and "150 KB," respectively, then if all the files generated in S105 have a size of not more than 40 KB as the first maximum size, the job control section 18a transmits the files to a destination indicated by the setting value of the item "SMTP" of the item "destination" of the setting values received from the Java platform 17a in S103, through the communication section 16. In other words, the communication section 16 transmits the files according to SMTP as the first transmission standard. Meanwhile, when any of the files generated in S105 has a size exceeding 40 KB as the first maximum size, and all the files generated in S105 have a size of not more than 150 KB as the second maximum size, the job control section 18a transmits the files to a destination indicated by the setting value of the item "FTP folder" of the item "destination" of the setting values received from the Java platform 17a in S103, through the communication section 16. In other words, the communication section 16 transmits the files according to FTP as the second transmission standard.

For example, when the setting value of the item "transmission mode" in the transmission setting 17c is "mode 4," and the setting value of the item "SMTP" of the term "maximum transmission size" in the transmission setting 17c is "40 KB," then if all the files generated in S105 have a size of not more than 40 KB as the first maximum size, the job control section 18a transmits the files to a destination indicated by the setting value of the item "SMTP" of the item "destination" of the setting values received from the Java platform 17a in S103, through the communication section 16. In other words, the communication section 16 transmits the files according to SMTP as the first transmission standard.

After the process of S106, the job control section 18a notifies the image transmission section 18c of the Java application 17b of the completion of the scanning/transmission job through the Java platform 17a (S107, S108). Therefore, the image transmission section 18c can display the end of scanning/transmission on the display section 12, for example.

Note that the operation of FIG. 3 is performed when the files generated in S105 can be transmitted according to a transmission standard normally supported by the MFP 10, i.e., one of SMTP, SMB, and FTP. When it is necessary to transmit the files generated in S105 according to a transmission standard other than the transmission standards normally supported by the MFP 10, the control section 18 performs an operation shown in FIG. 7.

Figure 7:
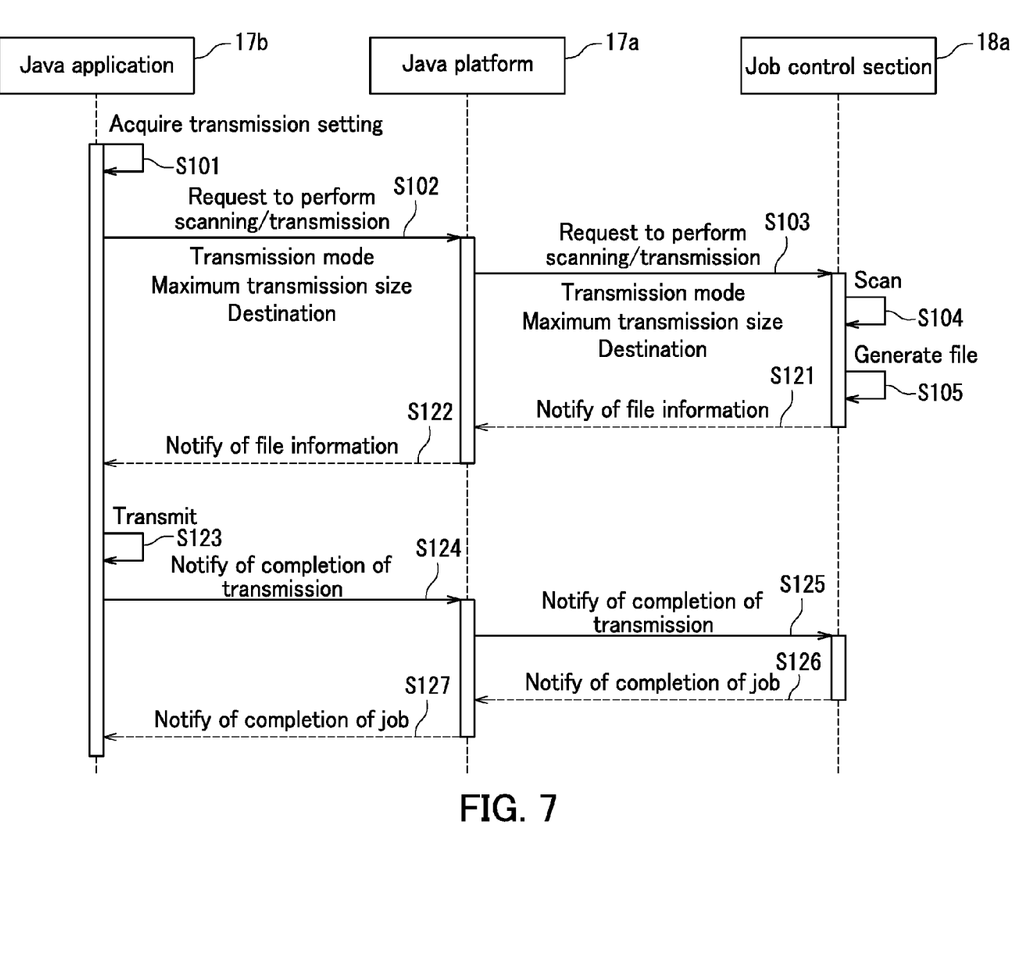
FIG. 7 is a sequence diagram showing an operation example of the MFP of FIG. 1 that is different from those of FIGS. 3 and 5.

FIG. 7 is a sequence diagram showing an operation example of the MFP 10 of FIG. 1 that is different from those of FIGS. 3 and 5. Note that S101-S105 of FIG. 7 correspond to S101-S105 of FIGS. 3 and 5, and provide similar processes. As shown in FIG. 7, when it is necessary for the job control section 18a to, after the process of S105, transmit the files generated in S105 according to a transmission standard other than those normally supported by the MFP 10, the job control section 18a notifies the image transmission section 18c of the Java application 17b of file information through the Java platform 17a (S121, S122). The file information is for identifying the files generated by the job control section 18a in S105. Note that, in S121, the file information may be one piece of information indicating a change in the above job status.

When the image transmission section 18c is notified of the file information through the Java platform 17a in S122, a file corresponding to the received file information is transmitted through the communication section 16 according to the setting values of the items "transmission mode," "maximum transmission size," and "destination" in the transmission setting 17c that have been acquired in S101 (S123).

For example, when the setting value of the item "transmission mode" in the transmission setting 17c is "mode 4," and the setting values of the items "SMTP" and "cloud service" of the term "maximum transmission size" in the transmission setting 17c are "40 KB" and "300 KB," respectively, then if any of the files generated in S105 has a size exceeding 40 KB as the first maximum size, and all the files generated in S105 have a size of not more than 300 KB as the second maximum size, the image transmission section 18c transmits the files to a destination indicated by the setting value of the item "cloud service" of the item "destination" in the transmission setting 17c, through the communication section 16.

After the process of S123, the image transmission section 18c notifies the job control section 18a of the completion of the transmission through the Java platform 17a (S124, S125).

The job control section 18a, when notified of the completion of the transmission in S125, notifies the image transmission section 18c of the completion of the scanning/transmission job through the Java platform 17a (S126, S127). Therefore, the image transmission section 18c of the Java application 17b can display the end of scanning/transmission on the display section 12, for example.

As described above, when the size of a first file containing image data read from an original document by the scanner 13 is not more than a first maximum size, the control section 18 transmits the first file according to a first transmission standard. When the size of the first file exceeds the first maximum size, the control section 18 transmits a second file according to a second transmission standard. Therefore, even when the size of a first file containing image data read from an original document by the scanner 13 exceeds a first maximum size, the image data can be transmitted without dividing each piece of sheet data included in the image data.

When the size of a first file containing image data read from an original document by the scanner 13 exceeds a first maximum size, and the size of a second file is not more than a second maximum size, the control section 18 transmits the second file according to a second transmission standard. When the size of the second file exceeds the second maximum size, the control section 18 cancels transmission of the second file. Therefore, when the size of a first file containing image data read from an original document by the scanner 13 exceeds a first maximum size, the transmission of a second file having a size exceeding the size of a file that can be transmitted according to a second transmission standard can be prevented or reduced.

The control section 18 generates a file, where each piece of sheet data included in image data is the smallest unit of division. Therefore, image data can be transmitted without dividing each sheet data included in image data.

The Java application 17b may cause the MFP 10 to use at least one of a first transmission standard and a second transmission standard as a file transmission standard. For example, the MFP 10 employs the Java application 17b to provide a second transmission standard according to which a file is transmitted to a cloud service. Specifically, when the control section 18 executes the Java application 17b, a file can be transmitted according to a transmission standard that is not supported by the MFP 10 in a state before execution of the Java application 17b. Therefore, the control section 18 can transmit the files generated in S105 without a problem. As a result, when a file that has already been transmitted is moved from the RAM to the HDD, the RAM can be efficiently used.

Similarly, in the MFP 10, a first transmission standard may be provided by the Java application 17b.

When a transmission standard provided by the Java application 17b may be a transmission standard other than those normally supported by the MFP 10, various protocols and services can be employed in addition to transmission of a file to a cloud service.

Although the image transmission apparatus of the present disclosure is an MFP in this embodiment, the image transmission apparatus of the present disclosure may be other image forming apparatuses, such as a scanner-only machine and the like, in addition to an MFP.

What is claimed is:

1. An image transmission apparatus comprising:
a reading device configured to read image data from an original document, the image data containing one or more pieces of sheet data;
a communication device configured to perform communication;
a setting acquisition section configured to acquire a transmission setting as a setting for transmission of the image data performed by the communication device; and
an image transmission section configured to transmit the image data read from the original document by the reading device, through the communication device, according to the transmission setting acquired by the setting acquisition section; and
a display section configured to display an item of information, wherein
the transmission setting includes
a first transmission standard for first-standard file transmission of a first-standard file or first-standard files, the first-standard file containing the image data, the first-standard files containing the image data,
a second transmission standard for second-standard file transmission of a second-standard file or second-standard files, the second-standard file containing the image data, the second-standard files containing the image data, the second transmission standard being different from the first transmission standard,
a first maximum size indicating a maximum value of a size of the first-standard file or each of the first-standard files allowed to be transmitted according to the first transmission standard, and
a second maximum size indicating a maximum value of a size of the second-standard file or each of the second-standard files allowed to be transmitted according to the second transmission standard, the second maximum size being larger than the first maximum size,
the image transmission section transmits the first-standard file including all of the pieces of the sheet data according to the first transmission standard when a sum of the size of all of the pieces of the sheet data is not more than the first maximum size,
the image transmission section transmits the first-standard files according to the first transmission standard where the first-standard files are generated with one of the pieces of the sheet data being the smallest unit of division when the sum of the size of all of the pieces of the sheet data exceeds the first maximum size and the size of each of the pieces of the sheet data is no more than the first maximum size,
the image transmission section transmits the second-standard file including all of the pieces of the sheet data according to the second transmission standard when the size of any of the pieces of the sheet data exceeds the first maximum size and the sum of the size of all of the pieces of the sheet data is not more than the second maximum size,
the image transmission section transmits the second-standard files according to the second transmission standard where the second-standard files are generated with one of the pieces of the sheet data being the smallest unit of division when the size of any of the pieces of the sheet data exceeds the first maximum size, the sum of the size of all of the pieces of the sheet data exceeds the second maximum size, and the size of each of the pieces of the sheet data is not more than the second maximum size, and
the image transmission section cancels image data transmission and the display section displays an error of the image data transmission when the size of any of the pieces of the sheet data exceeds the second maximum size.

2. The image transmission apparatus according to claim 1, further comprising:
a storage device configured to store the transmission setting; and
a job control section configured to generate the first-standard file or the first-standard files according to the transmission setting, wherein
the image transmission section transmits the first-standard file or the first-standard files according to Simple Mail Transfer Protocol as the first transmission standard.

3. The image transmission apparatus according to claim 2, wherein
the image transmission section transmits the second-standard file or the second-standard files according to Server Message Block, File Transfer Protocol, or a cloud service as the second transmission standard.

4. A non-transitory computer-readable storage medium having an application program stored therein, the application program causing an image transmission apparatus comprising a reading device configured to read image data from an original document, a communication device configured to perform communication, and a display section configured to display an item of information, to function as:

a setting acquisition section configured to acquire a transmission setting as a setting for transmission of the image data performed by the communication device, the image data containing one or more pieces of sheet data, and an image transmission section configured to transmit the image data read from the original document by the reading device, through the communication device, according to the transmission setting acquired by the setting acquisition section, wherein the transmission setting includes
- a first transmission standard for first-standard file transmission of a first-standard file or first-standard files, the first-standard file containing the image data, the first-standard files containing the image data,
- a second transmission standard for second-standard file transmission of a second-standard file or second-standard files, the second-standard file containing the image data, the second-standard files containing the image data, the second transmission standard being different from the first transmission standard,
- a first maximum size indicating a maximum value of a size of the first-standard file or each of the first-standard files allowed to be transmitted according to the first transmission standard, and
- a second maximum size indicating a maximum value of a size of the second-standard file or each of the second-standard files allowed to be transmitted according to the second transmission standard, the second maximum size being larger than the first maximum size, the image transmission section transmits the first-standard file including all of the pieces of the sheet data according to the first transmission standard when a sum of the size of all of the pieces of the sheet data is not more than the first maximum size, the image transmission section transmits the first-standard files according to the first transmission standard where the first-standard files are generated with one of the pieces of the sheet data being the smallest unit of division when the sum of the size of all of the pieces of the sheet data exceeds the first maximum size and the size of each of the pieces of the sheet data is no more than the first maximum size, the image transmission section transmits the second-standard file including all of the pieces of the sheet data according to the second transmission standard when the size of any of the pieces of the sheet data exceeds the first maximum size and the sum of the size of all of the pieces of the sheet data is not more than the second maximum size, the image transmission section transmits the second-standard files according to the second transmission standard where the second-standard files are generated with one of the pieces of the sheet data being the smallest unit of division when the size of any of the pieces of the sheet data exceeds the first maximum size, the sum of the size of all of the pieces of the sheet data exceeds the second maximum size, and the size of each of the pieces of the sheet data is not more than the second maximum size, and the image transmission section cancels image data transmission and the display section displays an error of the image data transmission when the size of any of the pieces of the sheet data exceeds the second maximum size.

* * * * *